Patented Jan. 12, 1932

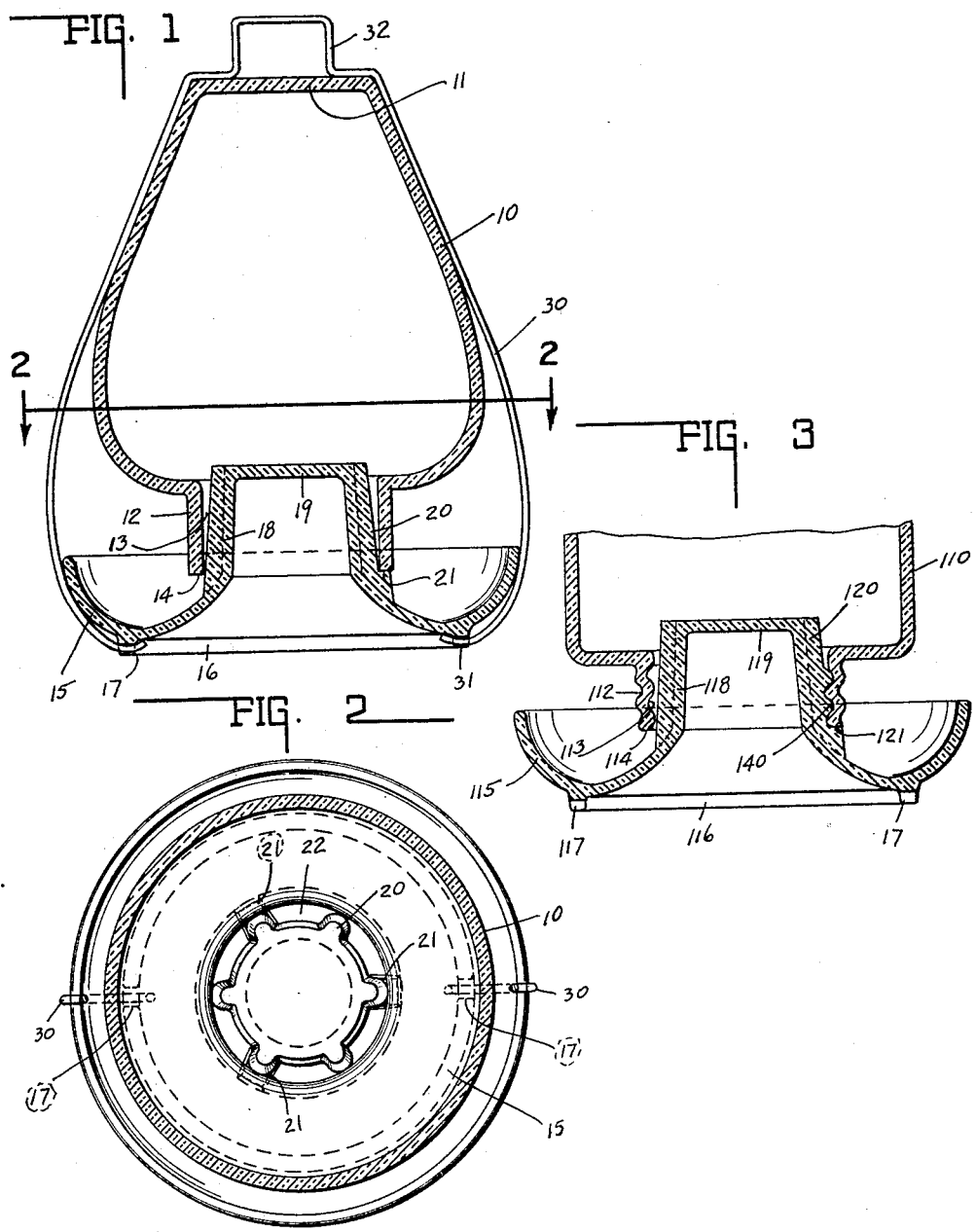

1,840,615

UNITED STATES PATENT OFFICE

JOSEPH O. ARDUSER AND ADDISON JENKINS, OF KOKOMO, INDIANA, ASSIGNORS TO D. C. JENKINS GLASS COMPANY, OF KOKOMO, INDIANA, A CORPORATION

POULTRY FEEDING DEVICE

Application filed November 21, 1927. Serial No. 234,631.

This invention relates to a poultry feeding device.

The chief feature of the invention consists in the formation of a poultry feeding device such that the feed is visible, free flowing and relatively sanitary.

The chief feature of the invention consists in the formation of the feeder of two separable vitreous parts, one serving as a bowl or jar and the other serving as a cover and base.

The full nature of the invention will be understood from the accompanying drawings and the following description and claims:

In the drawings Fig. 1 is a central sectional view through the invention. Fig. 2 is a transverse section view taken on line 2—2 of Fig. 1 and in the direction of the arrows. Fig. 3 is a vertical sectional view similar to the bottom portion of Fig. 1 and of a modified form of the invention.

In the drawings 10 indicates an urn type bowl or jar having a closed end 11 and an elongated neck 12 opposite therefrom with a discharge opening 13 including an outer peripheral edge or mouth 14.

The cover for the aforesaid jar or urn including an annular trough portion 15, its lower face including a circular foot or base ring 16 which herein is shown notched at 17 in diametrical relation. The inner wall of the annular base is extended upwardly as at 18 and forms a plug or centering spindle having a top closure portion 19. The central spindle or plug 18 is readily receivable by the elongated neck 12 and thus the jar is centered. The jar may be filled in the usual manner with the neck and mouth up and the cover or closure positioned in inverted relation thereon and the entire device then inverted.

The means for providing a feeding passage between the neck and plug is as follows:

Herein extending radially outwardly from the spindle or plug portion and in spaced relation are six ribs or vanes 20 which are tapered upwardly, as shown, and for feeding purposes the spindle or plug is likewise tapered. This tapering construction insures substantial centering of the jar. When the neck is seated upon the spindle the mouth or edge 14 rests upon shoulders 21 formed as extensions of every alternate rib. The arcuate channels indicated by the numeral 22 in Fig. 2, permit the mash or feed to discharge downwardly and outwardly from the bowl or jar and into the feeding trough 15. Since the device may be made of glass and preferably is, the chicks will see the feed and thereby increase their feeding.

By reason of the long neck and the elongated spindle portion tilting of the bowl or jar is extremely difficult. It will also be observed that the jar may be readily filled, cover or cap placed thereon all in normally inverted relation and then the device inverted as shown in Fig. 1, which insures automatic feeding of the jar contents.

To permit carrying and also when desired to insure locking of the two parts, a bale 30 having the inwardly and upwardly extending ends 31 and the finger engageable U-shaped central portion 32 is employed. The ends 31 seat in the grooves or notches 17 and thus the base and the jar are clampingly associated together, the finger portion 32 serving as a support or handle for carrying as well as for a clamping retainer if and when desired.

In Fig. 3 a modified form of the invention is illustrated in which 110 illustrates a bowl or jar having a neck 112 interiorly threaded as at 113 with a mouth 114. The annular trough 115 includes the annular ring or foot 116, the notches 117 and the upwardly tapered conical plug or spindle 118 with the closed end 119. Upon the same is similarly positioned the radial ribs 120 with alternate ribs provided with the stop portions 121. Herein each alternate rib, or if desired each rib, is provided with transversely arranged threads 140 to cooperate with the full threads 113 of the jar neck. The feed channels are arcuate as hereinbefore set forth.

The invention claimed is:

1. A feeding device including an inverted feed container having a closed upper end an elongated neck and a relatively wide mouth in its lower end, a feeding trough separate therefrom and projecting laterally and peripherally around said neck, and including an upwardly extending spindle receivable by said elongated neck for substantially closing the same and maintaining the container in vertical relation, a plurality of ribs extending radially from the spindle and having an upwardly tapered forward edge for engaging the inside of said neck and forming therewith a plurality of channels, said neck including a threaded interior, and threads formed on said tapered ribs constituting an interrupted thread for neck anchorage.

2. A device as defined by claim 1, said threaded ribs including a laterally directed offset for mouth engagement and limiting threading movement.

3. A feeding device including an inverted feed container having a closed upper end, an elongated neck and a relatively wide mouth in its lower end, a feeding trough separate therefrom and projecting laterally and peripherally around said neck, and including an upwardly extending spindle receivable by said elongated neck for substantially closing the same and maintaining the container in vertical relation, a plurality of ribs extending radially from the spindle and having an upwardly tapered forward edge for engaging the inside of said neck and forming therewith a plurality of channels, said neck including a threaded interior, and threads formed on said tapered ribs constituting an interrupted thread for neck anchorage, said threaded ribs including a laterally directed offset for mouth engagement and limiting threading movement.

4. A feeding device including an inverted feed container having a closed upper end, an elongated neck and a relatively wide mouth in its lower end, a feeding trough separate therefrom and projecting laterally and peripherally around said neck, and including an upwardly extending spindle receivable by said elongated neck for substantially closing the same and maintaining the container in vertical relation, a plurality of ribs extending radially from the spindle and having an upwardly tapered forward edge for engaging the inside of said neck and forming therewith a plurality of channels, said neck including a threaded interior, and threads formed on said tapered ribs constituting an interrupted thread for neck anchorage, said trough including an interrupted peripheral foot, and a U-shaped bail having its ends engaging the interruptions in the foot, its side portions embracing the container and its mid-portion projecting above the same in handle formation.

In witness whereof, we have hereunto affixed our signatures.

ADDISON JENKINS.
JOSEPH O. ARDUSER.